United States Patent [19]
Dan

[11] Patent Number: 5,295,582
[45] Date of Patent: Mar. 22, 1994

[54] RECYCLING POST CONSUMER PLASTIC PRODUCTS

[75] Inventor: Ervin R. Dan, Lexington, Mass.

[73] Assignee: Novacor Chemicals (International) S.A., Fribourg, Switzerland

[21] Appl. No.: 7,499

[22] Filed: Jan. 22, 1993

[51] Int. Cl.$^5$ ............................................. B03B 1/00
[52] U.S. Cl. ........................................ 209/3; 209/456; 264/37
[58] Field of Search ..................... 209/3, 11, 455–457, 209/44; 264/37

[56] References Cited

U.S. PATENT DOCUMENTS

| | | | |
|---|---|---|---|
| 4,830,188 | 5/1989 | Hannigan et al. | 209/3 |
| 5,110,055 | 5/1992 | Teeny | 209/3 X |
| 5,232,606 | 8/1993 | Leidner | 209/3 X |
| 5,232,607 | 8/1993 | Lundquist | 209/3 X |
| 5,234,110 | 8/1993 | Kobler | 209/3 X |

Primary Examiner—D. Glenn Dayoan
Attorney, Agent, or Firm—Bruce E. Harang

[57] ABSTRACT

The present invention relates to the cleaning of recyclable plastic. More particularly the recyclable plastic is treated at a frequency from 20 to 60 KHz, optionally in the presence of an antiseptic agent and in the absence of a surfactant. This treatment cleans waste, and particularly waste containing protein, such as medical or food waste so it is suitable for recycling.

39 Claims, No Drawings

RECYCLING POST CONSUMER PLASTIC PRODUCTS

FIELD OF THE INVENTION

The present invention relates to recycling of plastics. More specifically the present invention relates to cleaning of plastic wastes which are to be recycled. The plastic is a non-film, rigid foamed or non-foamed, oriented (both uni- and bi- axially oriented) or non-oriented, plastic. The plastic may have been used in the food or medical industry. The present invention does not extend to film material such as that used in agricultural applications such as mulches or green house coverings or in packaging.

BACKGROUND OF THE INVENTION

There is an increasing concern over the disposition of plastic waste. Many jurisdictions are seriously considering recycle content regulations requiring a specified percentage of plastic to be recycled. While this is seen as a politically and socially acceptable goal there are some concerns with some recycled plastics.

More particularly there is a concern with plastics which have been used in the food or medical fields. In the area of rigid plastic used in the packaging, display, and consumption of raw and cooked foods there is a concern with protein containing contaminants such as meat, blood and often the condiments used in association with cooked foods. Meat and blood residues are of particular concern as such contaminants tend to be difficult to remove. Of course this causes difficulties with sorting and preparation for recycling rigid plastic waste. The above concerns are even further heightened when medical wastes are considered.

In conventional cleaning methods the plastic recycle is cleaned either prior to or after shredding. The conventional methods require the use of hot water and cleaning agents such as detergents, surfactants, soaps and the like. Additionally, even if the washing medium, typically water is recycled, it must then be reheated. This is energy consuming.

WPI Accession no. 91-264337/36 of Japanese Patent 3175008 discloses a process in which agricultural film is pretreated to remove most of the dirt (e.g. the big lumps), ultrasonically washed, dewatered, crushed (fluffed) sorted and collected. The patent does not disclose the treatment of rigid polymers from the food or medical industries. Additionally, the reference requires a pre-washing step which has been eliminated from the process in accordance with the present invention.

WPI Accession no. 84-304130/49 of Japanese patent 59189946 discloses a process for treating waste plastic films. In the process the film is rough washed, dewatered, subjected to a water cutter (i.e. lance or knife or the like) which cuts and rewashes the film pieces, dewatered and finally washed with warm water in an ultrasonic wash tank. The reference deals with film and contains a number of pretreatment steps which are avoided in a process in accordance with the present invention. Additionally, the present invention contemplates the use of a washing medium at substantially ambient temperatures and in a preferred embodiment the multiple use or recycling of the washing medium.

Accordingly, there is a need for a simple economic process to clean waste rigid plastic used in the food or medical industries.

SUMMARY OF THE INVENTION

The present invention provides a process for removing at least one contaminant from a rigid plastic waste comprising:

i) submersing at least a portion of said rigid plastic waste in a liquid at atmospheric pressure and at a temperature from 0° to 35°, preferably from 5° to 30°, most preferably from 10° to 25° C., which liquid preferably does not contain any cleaning agent;

ii) subjecting said liquid to a transducer to generate waves through said liquid at a frequency from 20 to 60 KHz for a time sufficient to remove said at least one contaminant from said rigid plastic waste;

iii) separating said rigid plastic waste from said liquid; and iv) recycling said liquid.

DETAILED DESCRIPTION

The plastic wastes which may be treated in accordance with the present invention are rigid plastics as opposed to film plastics such as for example the films used in agricultural applications. The rigid plastic may be solid or foamed. The plastics may have been used in the packaging and/or preparation of foods or in the medical or related fields. The plastic waste may be essentially one type of plastic (that is it may have already been sorted) or it may be a mixture of plastics which may be subsequently be sorted. Preferably if the plastic is or is to be sorted the sorting process should be automated to the maximum extent.

The plastics which may be treated in accordance with the present invention may selected from the group consisting of:

A) vinyl aromatic polymers comprising:
  i) from 100 to 30, preferably from 100 to 50, most preferably from 100 to 70 weight % of one or more $C_{8-12}$ vinyl aromatic monomers which are unsubstituted or substituted by a $C_{1-4}$ alkyl radical;
  ii) from 0 to 70, preferably from 0 to 50, most preferably from 0 to 30, weight % of one or 4more monomers selected from the group consisting of $C_{1-4}$ alkyl and hydroxyalkyl esters of $C_{3-6}$ ethylenically unsaturated carboxylic acids, anhydrides of $C_{4-6}$ ethylenically unsaturated dicarboxylic acids, and $C_{3-5}$ α-,β- ethylenically unsaturated nitriles; and
  iii) from 0 to 5, preferably from 0.5 to 3 weight % of a functional monomer selected from the group consisting of:
    a) $C_{3-6}$ ethylenically unsaturated mono- or di- carboxylic acids;
    b) amides of $C_{3-6}$ ethylenically unsaturated mono- or di- carboxylic acids; and
    c) imides of $C_{4-6}$ ethylenically unsaturated dicarboxylic acids; which polymer may be grafted onto from 0 to 15, preferably from 4 to 10 weight % of a rubbery polymer selected from the group consisting of:
  i) co- or homopolymers of one or more $C_{4-6}$ conjugated diolefins;
  ii) copolymers comprising:
    a) from 20 to 80 weight % of one or more $C_{8-12}$ vinyl aromatic monomers; and
    b) from 80 to 20 weight % of one or more $C_{4-6}$ conjugated diolefins; and
  iii) copolymers comprising:
    a) from 85 to 45 weight % of one or more $C_{4-6}$ conjugated diolefins; and b) from 15 to 55 weight % of one or more $C_{3-5}$ $\alpha$-,$\beta$- ethylenically unsaturated nitriles;

B) polyolefin polymers comprising:
  i) from 93 to 96 weight % of a $C_{2-3}$ $\alpha$- olefin; and
  ii) from 7 to 4 weight % of a $C_{4-10}$ $\alpha$- olefin; and C) polyester polymers comprising:
  i) from 50 to 80 weight % of one or more $C_{8-14}$ aromatic dicarboxylic acids;
  ii) from 20 to 50 weight % of one or more glycols selected from the group consisting of $C_{2-10}$ alkylene glycols and $C_{6-10}$ cyclic glycols; and
  iii) from 0 to 10 weight % of one or more $C_{3-10}$ saturated aliphatic dicarboxylic acids.

Suitable vinyl aromatic monomers include styrene, $\alpha$-methyl styrene, p-methyl styrene and t-butyl styrene. Suitable $C_{1-4}$ alkyl and hydroxyalkyl esters of $C_{3-6}$ ethylenically unsaturated carboxylic acids include methyl methacrylate, ethyl methacrylate, methyl acrylate, and ethyl acrylate. Suitable $C_{3-5}$ $\alpha$-,B- ethylenically unsaturated nitriles include acrylonitrile and methacrylonitrile. Suitable anhydrides of dicarboxylic acids include maleic anhydride. Suitable functional monomers include acrylic acid, methacrylic acid, itaconic acid, fumaric acid and maleic acid and the amides of such acids and maleimide.

The vinyl aromatic polymer may be a homopolymer of one or more $C_{8-12}$ vinyl aromatic monomers such as polystyrene. The plastic may be a copolymer of a vinyl aromatic monomer and a $C_{1-4}$ alkyl or hydroxyalkyl ester of a $C_{3-6}$ ethylenically unsaturated carboxylic acid. Such a copolymer typically may comprise from 80 to 50 weight % of styrene and from 20 to 50 weight % of one or more monomers selected from the group consisting of methyl methacrylate, ethyl acrylate, methyl acrylate, and ethyl acrylate, most preferably a copolymer of styrene and methyl methacrylate. The vinyl aromatic polymer may be a copolymer of a vinyl aromatic monomer and a $C_{3-5}$ $\alpha$-,B- ethylenically unsaturated nitrile. Such a copolymer may typically comprise from 95 to 70 preferably from 10 to 70 weight % of one or more vinyl aromatic monomers and from 5 to 30, most preferably from 10 to 30 weight % of one or more nitrile monomers. These types of copolymers are known as styrene acrylonitrile polymers (SAN). Such vinyl aromatic polymers may typically comprise from 95 to 70, preferably from 95 to 75 weight % of one or more vinyl aromatic monomers and from 5 to 30, preferably from 5 to 25 weight % of one or more $C_{3-5}$ $\alpha$-,B- ethylenically unsaturated nitrile monomers such as acrylonitrile and methacrylonitrile. The vinyl aromatic polymer may typically comprise from 95 to 70, preferably from 95 to 75 weight % of one or more vinyl aromatic monomers and from 5 to 30, preferably from 5 to 25 weight % of one or more anhydrides of a $C_{4-6}$ ethylenically unsaturated dicarboxylic acids, most preferably maleic anhydride.

The vinyl aromatic polymers may be functionalized. That is they may contain up to 5, most preferably from 0.5 to 3 weight % of one or more a functional monomers. The vinyl aromatic polymer may be grafted to a rubbery polymer as in the case of high impact polystyrene, or SAN polymers grafted to butadiene (acrylonitrile butadiene styrene polymers known as ABS) or styrene acrylates grafted to butadiene (typically known as methyl methacrylate butadiene styrene (MBS) polymers. Such a polymer comprises one or More $C_{8-12}$ vinyl aromatic monomers modified with or grafted to from 0 to 15, typically from 3 to 15, most preferably from 4 to 10 weight % of a rubbery polymer. In such polymers the rubbery polymer is dispersed through out the matrix of the vinyl aromatic polymer and is sometimes referred to as the rubber or rubbery phase. Typically the rubbery phase may be a homopolymer of a $C_{4-6}$ conjugated diolefin such as polybutadiene. Such polymers may have a stereo configuration such that for example more than 95 weight % of the rubbery polymer is in the cis-configuration. In other impact modified polymers from about 50 to 60, typically about 55 weight % of the rubbery polymer is in the cis-configuration. The rubber modifier or substrate may also be a random copolymer comprising from 20 to 80, preferably 40 to 60 weight % of one or more $C_{8-12}$ vinyl aromatic monomers such as styrene, $\alpha$-methyl styrene, p-methyl styrene and t-butyl styrene and correspondingly from 80 to 20, preferably from 60 to 40 weight % of one or more $C_{4-6}$ Conjugated diolefins such as butadiene or isoprene. The rubbery substrate may also be a copolymer comprising from 85 to 45, preferably from 80 to 50 weight % of one or more $C_{4-6}$ Conjugated diolefins as indicated above and correspondingly from 15 to 55, preferably from 20 to 50 weight % of one or more $C_3$. $\alpha$-,$\beta$- ethylenically unsaturated nitriles. Suitable nitriles include acrylonitrile and methacrylonitrile.

The above vinyl aromatic or styrenic type polymers have been used in the (fast) food industry for eating implements such as knives, forks, straws, plates, insulated containers, such as hot drink cups or hot food containers (e.g. clam shells), lids for drink containers and drinking containers per se (e.g. cups and bottles).

The plastic may be a polyolefin such as polyethylene or polypropylene. Generally polyolefins comprise from 93 to 96 weight % of a $C_{2-3}$ $\alpha$- olefin, preferably ethylene and from 7 to 4 weight % of a $C_{4-10}$ $\alpha$- olefin such as 1-butene, 1-hexene, or 1-octene.

Polyolefins are used in many complementary and competing applications for which polymers of vinyl aromatic monomers are used. Polyolefins may also be used in medical applications such as syringes, and medical tubing.

The plastic may be a polyester such as polyethylene terephthalate which is commonly use in such diverse applications as bottles for carbonated beverages and carpet fibre. Suitable polyesters comprise from 50 to 80 weight % of one or more $C_{8-14}$ aromatic dicarboxylic acids; from 20 to 50 weight % of one or more glycols selected from the group consisting of $C_{2-10}$ alkylene glycols and $C_{6-10}$ cyclic glycols; and from 0 to 10 weight % of one or more $C_{3-10}$ saturated aliphatic dicarboxylic acids.

Suitable $C_{8-14}$ aromatic dicarboxylic acids include terephthalic acid and isophthalic acid. Lower ($C_{1-4}$) alkyl esters of such acids include dimethyl terephthalate (DMT). Terephthalic acid and DMT are particularly useful in preparing polyesters. Useful $C_{2-10}$ alkylene glycols include ethylene glycol and butylene glycol and their higher homologues such as 1,10-decamethylene glycol. These monomers may be used to prepare polyesters such as polyethylene terephthalate (PET) and polybutylene terephthalate (PBT). The polyesters may contain a small amount of a $C_{6-10}$ cyclic diol such as in PETG.

If desired, the polyester may contain from 0 up to 10, preferably less than 5 weight % of one or more aliphatic dicarboxylic acids. Some aliphatic dicarboxylic acids include adipic acid, sebacic acid, azelaic acid and dodecandioic acid.

In some senses the plastics industry has been too successful. That is the above indicates that many plastics are useful in a very wide range of applications. Unfortunately, this wide range of applications raises fundamental concerns with regard to recycling. While many recycling markets at first glance appear to be quite benign a little more thought raises concerns. For example recycled plastic may find its way into the toy market which at first glance seems quite benign. However, one of the first things to go into an infant's mouth is a baby toy. Accordingly, there is a concern regarding the cleaning and possible sterilization of a broad range of recycled rigid plastic wastes.

Depending on the relative size of the cleaning chamber, the plastic may be sized. That is the plastic waste may be shredded into particles having a largest dimension of not greater than 5 inches (12.5 cm). Preferably, the particles of plastic may have a greatest dimension of less than 3 inches (7.5 cm). The plastic may be reduced to particles having a longest dimension from 1 to 0.25 inches (2.5 to 0.6 cm). However, the value or utility of shredding the plastic will ultimately depend upon the cost and expense of shredding the plastic versus the gains in through put obtained due to being able to handle a larger number of smaller pieces. As noted above the present invention may be practised using plastic recycle which has already been shredded or using plastic recycle which is to be subsequently shredded.

At least a part (i.e. the dirty part or portion) of the rigid plastic, or the pieces of the rigid plastic are submerged in a liquid at atmospheric pressure and at temperatures from 0° to 35° C. preferably from 5° to 30°, most preferably from 10 to 25° C. Typically the temperature of the liquid will be within 5°, preferably within 3°, most preferably within 1° C. of the ambient temperature. The liquid need not and preferably does not contain any cleaning agent. That is the liquid need not contain any soap, surfactant, synthetic detergent, or the like. If a surfactant is used it may be present in an amount from 0 to 1, preferably from 0 to 0.5 weight % based on the liquid. The liquid may be water or a $C_{1-4}$ alkanol such as methanol, ethanol and the like. The liquid may be a mixture of two or more of the above noted components. Alcohols are advantageous where there is a particular concern about disinfecting the plastic waste. Additionally, the alcohols may be recovered by a fairly simple distillation process for further use in the washing system of the present invention. Of course as noted above the liquid may be used in multiple washing cycles prior to recovery.

In the case of a rigid plastic which has a density less than the density of the liquid in which it is being treated it will be necessary to physically submerge the plastic in the liquid. This may be done in a batch process by a submersible retaining means such as a net or screen which fits into the transducer section of the cleaner. In a continuous process the transducer section of the treatment may be located within a tank of the liquid and the plastic conveyed through the transducer section. For example the transducer could form a submerged "tunnel" within a tank. The plastic would be fed into the tunnel to ensure that it is submerged.

The liquid may be subjected to an antiseptic treatment either proximate to or concurrently with the cleaning step. The antiseptic treatment may be the addition of a chemical agent or it may involve subjecting the liquid to a physical treatment. The chemical treatment may comprise adding to the liquid an oxidizing agent. The oxidizing agent may be a halogen such as chlorine, bromine, chlorine dioxide, or a peroxide such as hydrogen peroxide or an organic peroxide. If an agent is added to the liquid it may be added to the fluid in an amount from 1 to 10 weight %. If an agent is added to the liquid preferably it is concurrently with, prior to (i.e. shortly before) or subsequently to the washing step. The liquid may be subjected to a physical treatment. The liquid may be exposed to a form of irradiation to sterilize the liquid and the plastic within the liquid. Such a treatment may be carried out concurrently with or subsequently to the washing step. The irradiation step may comprise exposing the liquid and plastic to ultraviolet irradiation, electron beam radiation, gamma radiation and X-rays. The dosage of irradiation should be sufficient to ensure sterilization of the plastic waste and the liquid.

In the process of the present invention the liquid containing the rigid plastic waste is subjected to a transducer to generate waves through the liquid at a frequency from 20 to 60 KHz. This frequency of wave causes cavitation within the liquid at the surface of the rigid plastic which results in turbulence at the surface of the plastic. This turbulence removes the contamination from the surface and inner structure if the plastic is porous or foamed.

The treatment of the rigid plastic waste in a liquid medium with the waves at a frequency from 20 to 60 KHz should be sufficient to remove substantially all of the contaminants. The duration of treatment will depend on the type of contaminant; the amount of contaminant and the passage of time prior to treatment. Generally times from seconds to minutes, preferably less than 10 minutes, most preferably from 30 seconds to 5 minutes should be sufficient to remove substantially all of the contamination.

The process of the present invention could be practised batch wise or continuously. In a batch process a bath or container filled with liquid and having a transducer therein is loaded and emptied for each treatment. In a continuous process the transducer section could, for example be completely submerged in a bath and the rigid plastic could be passed through the section at a continuous rate to ensure a sufficiently long treatment to clean the plastic. A particularly difficult piece of plastic may be subject to multiple cycles if necessary to properly clean the plastic. Preferably, for the system to be commercially effective there should be no need to further separate any waste not properly cleaned in the process and recycle it through the transducer section of the cleaner. The cost of such a manual separation process may tend to over come the economics of the process of the present invention. For smaller establishments such as fast food restaurants it may be much simpler to operate the process in a batch mode. In the process of the present invention the rigid plastic waste is separated from the liquid in which the treatment has been carried out. This may be a simple process such as removing, the plastic from the liquid such as by a manual process or by screening the plastic from the liquid.

The process of the present invention further comprises recycling the liquid. As noted above the liquid could be treated with a sterilization additive. The liquid may be filtered to remove most of the particulate contaminants. The liquid may then be subject to further treatments such as a flocculation treatment for water or centrifugal treatment to settle out the contaminants, or in the case of a low boiling hydrocarbon such as methanol a low pressure boiling to distil the liquid. Typically the liquid is at a temperature from 0° to 35°, preferably from 5° to 30°, most from 10° to 25 0C. The recycled liquid may pass through a heat exchanger to help extract heat from liquid before being discarded. The recovered liquid is recycled to the transducer section for reuse.

The separated plastic may then be passed on to a further recycling operation such as pelletization and then sold for refabrication.

The present invention will now be illustrated by the following examples which are not intended to limit the invention. In the examples unless otherwise specified parts are parts by weight, weight is in grams and % is weight %.

EXAMPLE 1

A foam polystyrene meat tray was covered with ketchup and mustard and left to dry inside a plastic bag for a period of 24 hours. The tray was then cut into 1" (2.5 cm) squares. An ultrasonic washer was filled with water at room temperature without any detergent. A 500 ml beaker was filled with room temperature water without detergent and the samples of dirty polystyrene foam were placed in the beaker. A smaller beaker (350 ml) was then placed in the large beaker to keep the plastic samples submerged. Both beakers were placed in the ultrasonic cleaner and subject to waves at a frequency from 20 to 60 KHz for five minutes. At the end of this treatment there was no visible ketchup or mustard on the segments of polystyrene foam.

The experiment demonstrates ultrasonic cleaning is effective for removing food waste from rigid plastic.

What is claimed is:

1. A process for removing at least one contaminant from one or more rigid plastic wastes comprising:
    i) submersing at least a portion of said rigid plastic waste in a liquid at atmospheric pressure and a temperature from 0° to 35° C., which liquid contains from 0 to 1 weight % of one or more cleaning agents;
    ii) subjecting said liquid to a transducer to generate waves through said liquid at a frequency from 20 to 60 KHz for a time sufficient to remove said at least one contaminant from said rigid plastic waste;
    iii) separating said rigid plastic waste from said liquid; and
    iv) recycling said liquid.

2. The process according to claim 1, wherein said liquid is selected from the group consisting of water, $C_{1-4}$ alkanols, and mixtures thereof.

3. The process according to claim 2, wherein said one or more rigid plastic wastes is selected from the group consisting of foamed, nonfoamed, uniaxially oriented, biaxially oriented and non-oriented rigid plastic waste.

4. The process according to claim 3, wherein said one or more rigid plastic wastes is selected from the group consisting of:
   A) vinyl aromatic polymers comprising:
       i) from 100 to 30 weight % of one or more $C_{8-12}$ vinyl aromatic monomers which are unsubstituted or substituted by a $C_{1-4}$ alkyl radical;
       ii) from 0 to 70 weight % of one or more monomers selected from the group consisting of $C_{1-4}$ alkyl and hydroxyalkyl esters of $C_{3-6}$ ethylenically unsaturated carboxylic acids, anhydrides of $C_{4-6}$ ethylenically unsaturated dicarboxylic acids, and $C_{3-5}$ α-,β- ethylenically unsaturated nitriles; and
       iii) from 0 to 5 weight % of a functional monomer selected from the group consisting of:
           a) $C_{3-6}$ ethylenically unsaturated mono- or dicarboxylic acids;
           b) amides of $C_{3-6}$ ethylenically unsaturated mono- or di- carboxylic acids; and
           c) imides of $C_{4-6}$ ethylenically unsaturated dicarboxylic acids;
       polymers may be grafted onto from 0 to 15, weight % of a rubbery polymer selected from the group consisting of:
           i) co- or homopolymers of one or more $C_{4-6}$ conjugated diolefins;
           ii) copolymers comprising:
               a) from 20 to 80 weight % of one or more $C_{8-12}$ vinyl aromatic monomers; and
               b) from 80 to 20 weight % of one or more $C_{4-6}$ conjugated diolefins; and
           iii) copolymers comprising:
               a) from 85 to 45 weight % of one or more $C_{4-6}$ conjugated diolefins; and
               b) from 15 to 55 weight % of one or more $C_{3-5}$ α-,β-ethylenically unsaturated nitriles;
   B) polyolefin polymers comprising:
       i) from 93 to 96 weight % of a $C_{2-3}$ α- olefin; and
       ii) from 7 to 4 weight % of a $C_{4-10}$ α- olefin; and
   C) polyester polymers comprising:
       i) from 50 to 80 weight % of one or more $C_{8-14}$ aromatic dicarboxylic acids;
       ii) from 20 to 50 weight % of one or more glycols selected from the group consisting of $C_{2-10}$ alkylene glycols and $C_{6-10}$ cyclic glycols; and
       iii) from 0 to 10 weight % of one or more $C_{3-10}$ saturated aliphatic dicarboxylic acids.

5. The process according to claim 4, further comprising sizing said rigid plastic waste to particles having a dimension no greater than 12.5 cm.

6. The process according to claim 5, wherein said rigid plastic waste has been used in the food or medical industry.

7. The process according to claim 6, wherein said at least one contaminant is a protein containing substance.

8. The process according to claim 7, further comprising subjecting said liquid to an antiseptic treatment either concurrently with, prior to, or subsequently to subjecting said liquid to said transducer.

9. The process according to claim 8, wherein said antiseptic treatment comprises adding an oxidizing agent to said liquid.

10. The process according to claim 9, wherein said oxidizing agent is added to said liquid in an amount from 1 to 10 weight % and is selected from the group consisting of hydrogen peroxide, chlorine, bromine, chlorine dioxide or a mixture thereof.

11. The process according to claim 10, wherein said rigid plastic waste is a homo- or co- polymer of one or more $C_{8-12}$ vinyl aromatic monomers selected from the group consisting of styrene, α-methyl styrene, p-methyl styrene and t-butyl styrene.

12. The process according to claim 11, wherein said polymer is grafted onto from 4 to 10 weight % of polybutadiene.

13. The process according to claim 10, wherein said rigid plastic waste is a polymer comprising from 80 to 50 weight % of styrene and from 20 to 50 weight % of one or more monomers selected from the group consisting of methyl methacrylate, ethyl methacrylate, methyl acrylate, and ethyl acrylate.

14. The process according to claim 13, wherein said polymer is grafted onto from 4 to 10 weight % of polybutadiene.

15. The process according to claim 10, wherein said rigid plastic waste is a polymer comprising from 95 to 70 weight % of styrene and from 5 to 30 weight % of one or more monomers selected from the group consisting of acrylonitrile and methacrylonitrile.

16. The process according to claim 15, wherein said polymer is grafted onto from 4 to 10 weight % of polybutadiene.

17. The process according to claim 10, wherein said rigid plastic waste is a polymer comprising from 95 to 70 weight % of styrene and from 5 to 30 weight % of maleic anhydride.

18. The process according to claim 10, wherein said rigid plastic waste is a polymer comprising:
   i) from 93 to 96 weight % of a $C_{2-3}$ α- olefin; and
   ii) from 7 to 4 weight % of a $C_{4-10}$ α- olefin.

19. The process according to claim 18, wherein in said polymer said $C_{2-3}$ α-olefin is ethylene.

20. The process according to claim 10, wherein said rigid plastic waste is a polymer comprising:
   i) from 50 to 80 weight % of one or more $C_{8-14}$ aromatic dicarboxylic acids;
   ii) from 20 to 50 weight % of one or more glycols selected from the group consisting of $C_{2-10}$ alkylene glycols and $C_{6-10}$ cyclic glycols; and
   iii) from 0 to 10 weight % of one or more $C_{3-10}$ saturated aliphatic dicarboxylic acids.

21. The process according to claim 20, wherein said rigid plastic waste is selected from the group consisting of polyethylene terephthalate and polybutylene terephthalate.

22. The process according to claim 8, wherein said antiseptic treatment comprises subjecting said liquid to irradiation selected from the group consisting of ultraviolet irradiation, electron beam irradiation, gamma irradiation, and X-ray irradiation and is carried out concurrently with subjecting said liquid to said transducer.

23. The process according to claim 22, wherein said rigid plastic waste is a homo - or co- polymer of one or more $C_{8-12}$ vinyl aromatic monomers selected from the group consisting of styrene, α-methyl styrene, p-methyl styrene and t-butyl styrene.

24. The process according to claim 23, wherein said polymer is grafted onto from 4 to 10 weight % of polybutadiene.

25. The process according to claim 22, wherein said rigid plastic waste is a polymer comprising from 80 to 50 weight % of styrene and from 20 to 50 weight % of one or more monomers selected from the group consisting of methyl methacrylate, ethyl methacrylate, methyl acrylate, and ethyl acrylate.

26. The process according to claim 25, wherein said polymer is grafted onto from 4 to 10 weight % of polybutadiene.

27. The process according to claim 22, wherein said rigid plastic waste is a polymer comprising from 95 to 70 weight % of styrene and from 5 to 30 weight % of one or more monomers selected from the group consisting of acrylonitrile and methacrylonitrile.

28. The process according to claim 27, wherein said polymer is grafted onto from 4 to 10 weight % of polybutadiene.

29. The process according to claim 22, wherein said rigid plastic waste is a polymer comprising from 95 to 70 weight % of styrene and from 5 to 30 weight % of maleic anhydride.

30. The process according to claim 22, wherein said rigid plastic waste is a polymer comprising:
   i) from 93 to 96 weight % of a $C_{2-3}$ α- olefin; and
   ii) from 7 to 4 weight % of a $C_{4-10}$ α- olefin.

31. The process according to claim 30, wherein in said polymer said $C_{2-3}$ α-olefin is ethylene.

32. The process according to claim 22, wherein said rigid plastic waste is a polymer comprising:
   i) from 50 to 80 weight % of one or more $C_{8-14}$ aromatic dicarboxylic acids;
   ii) from 20 to 50 weight % of one or more glycols selected from the group consisting of $C_{2-10}$ alkylene glycols and $C_{6-10}$ cyclic glycols; and
   iii) from 0 to 10 weight % of one or more $C_{3-10}$ saturated aliphatic dicarboxylic acids.

33. The process according to claim 32, wherein said rigid plastic waste is selected from the group consisting of polyethylene terephthalate and polybutylene terephthalate.

34. The process according to claim 6, wherein said liquid comprises one or more $C_{1-4}$ alkanols.

35. The process according to claim 34, wherein said liquid comprises methanol, ethanol, or a mixture thereof.

36. The process according to claim 10, wherein said liquid comprises one or more $C_{1-4}$ alkanols.

37. The process according to claim 36, wherein said liquid comprises methanol, ethanol, or a mixture thereof.

38. The process according to claim 22, wherein said liquid comprises one or more $C_{1-4}$ alkanols.

39. The process according to claim 38, wherein said liquid comprises methanol, ethanol, or a mixture thereof.

* * * * *